United States Patent [19]

Sokol

[11] Patent Number: 4,648,572
[45] Date of Patent: Mar. 10, 1987

[54] BRACKET FOR SUPPORTING A RADAR DETECTOR OR LIKE DEVICE

[75] Inventor: Steve Sokol, Southfield, Mich.

[73] Assignee: Detroit Bracket Co., Inc., Ferndale, Mich.

[21] Appl. No.: 776,793

[22] Filed: Sep. 17, 1985

[51] Int. Cl.[4] ............................................. F16B 47/00
[52] U.S. Cl. ............................. 248/206.2; 248/205.2; 248/206.3
[58] Field of Search .............. 248/206.2, 206.3, 206.4, 248/205.5, 205.6, 205.7, 205.8, 206.1, 205.2

[56] References Cited

U.S. PATENT DOCUMENTS

| | | | |
|---|---|---|---|
| 967,627 | 8/1910 | Florsheim | 248/206.3 X |
| 1,384,727 | 7/1921 | Hutcheson | 248/206.3 |
| 1,799,445 | 4/1931 | Stansberry | 248/206.3 X |
| 1,849,338 | 3/1932 | Stansberry | 248/206.3 |
| 1,852,599 | 4/1932 | Zaiger et al. | 248/206.3 X |
| 2,392,091 | 1/1946 | Kieft | 248/206.4 |
| 2,557,434 | 6/1951 | Hoverder | 248/205.6 X |
| 2,650,870 | 9/1953 | Carpenter | 311/21 |
| 2,980,379 | 4/1961 | Goldfus | 248/206.4 |
| 3,847,316 | 11/1974 | McInnes | 244/42.1 |
| 3,918,666 | 11/1975 | Florian | 248/206.3 X |
| 4,079,987 | 3/1978 | Bumgardner | 296/37.7 |
| 4,548,375 | 10/1985 | Moss | 248/205.2 |

FOREIGN PATENT DOCUMENTS 0149955 12/1931 Switzerland ..................... 248/206.4

Primary Examiner—Ramon O. Ramirez
Attorney, Agent, or Firm—Gifford, Groh, VanOphem, Sheridan, Sprinkle and Dolgorukov

[57] ABSTRACT

A bracket for supporting a radar detector or like device on the windshield of a motor vehicle such that the device is readily accessible to the user. The bracket generally includes a substantially planar support which has first and second portions disposed at an acute angle to one another. Secured to the second portion of the support are two main suction cups and one secondary suction cup which may be adjusted according to the slope of the vehicle windshield. The radar detector or like device is secured to the first portion of the support which is maintained in a horizontal position upon mounting the bracket.

12 Claims, 3 Drawing Figures

BRACKET FOR SUPPORTING A RADAR DETECTOR OR LIKE DEVICE

BACKGROUND OF THE INVENTION

I. Field of the Invention

The invention relates to brackets for mounting electronic devices, such as radar detectors, to an interior surface of a motor vehicle and, in particular, to a dismountable bracket which utilizes a plurality of suction cups to mount the device to the windshield of the motor vehicle.

II. Description of the Prior Art

With the advent of sophisticated, and often expensive, electronic equipment for motor vehicles, means for securely protecting such equipment have become increasingly popular. Since thieves have never been thwarted by equipment which is built into the dashboard of a motor vehicle, the only method of absolutely preventing the unauthorized removal of the equipment is to remove it upon leaving the vehicle. In addition, many radar detecting devices must be placed in the vehicle compartment in a position which is unobstructed by the dashboard or the front portion of the vehicle in order to work properly.

The simplest means for storing the electronic device in a removable position is to place it on the floor or transmission hump of the vehicle compartment. In the case of the radar detector, the device may be most conveniently placed on top of the dashboard. However, by simply laying the device down, any sudden stops or turns will cause the device to slide thereby causing damage to its internal components or the electrical connections. Moreover, since many of these devices have metal housings, they may scratch the interior of the vehicle.

In order to provide a more secure mounting of these devices, various brackets have been developed which permit release of the device as necessary. Generally, these brackets are mounted to the underside or other portion of the dashboard thereby fixedly securing the bracket to the vehicle interior. Upon seeing even the empty bracket, a thief is alerted to the fact that the vehicle owner is in possession of some type of elecronic equipment and may look in other parts of the vehicle to locate the device. Moreover, because these brackets are mounted to the dashboard, damage may be caused to the dashboard during installation or prolonged use.

The dashboard mounted brackets are also of little use for radar detectors and the like which require an unobsructed detection area or in compact and sub-compact vehicles which have little or no leg room to mount the bracket. Thus, above the dashboard mounting of the device is necessary. Although some radar detectors and the like are provided with clips which permit attachment to the vehicle visor, prolonged use can cause the visor to sag.

SUMMARY OF THE PRESENT INVENTION

The present invention is an improved bracket for supporting a radar detector or like device within a motor vehicle which overcomes the disadvantages of the previously known mounting methods.

The bracket according to the present invention comprises a first substantially planar support portion which is integrally formed with a second or mounting portion disposed at an acute angle with respect to each other. Secured to the second portion of the support are two main suction cups and one smaller, secondary suction cup. The secondary suction cup is adjustable so that the bracket may be mounted to vehicle windshields of different slopes while maintaining the first portion of the support in a substantially horizontal position.

In order to attach a radar detector or like device to the bracket, the underside of the horizontally extending portion of the support and the top of the device to be mounted are provided with matching hook and pile strips. Thus, both the device and the bracket may be removed from the vehicle simultaneously by dismounting the bracket from the windshield or, alternatively, the device alone can be removed by detaching the detector from the bracket.

Other objects, features, and advantages of the invention will be apparent from the following detailed description taken in connection with the accompanying drawing.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views, and in which.

DETAILED DESCRIPTION OF A PREFERRED EMBODIMENT OF THE PRESENT INVENTION

Figure 1:
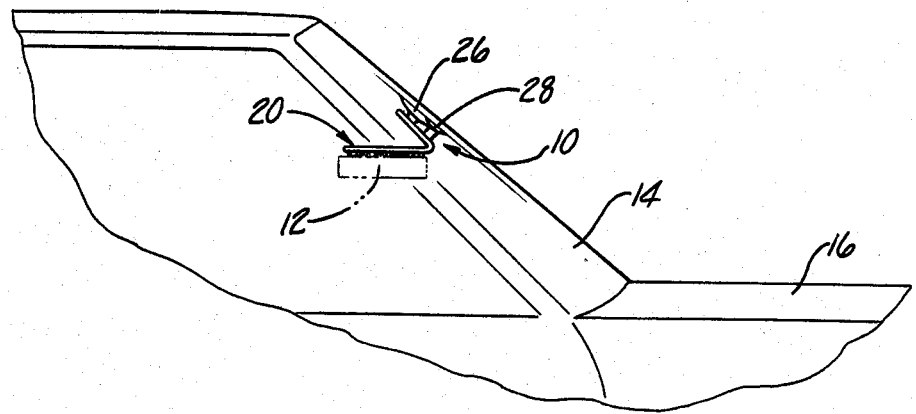
FIG. 1 is a plan perspective of the present invention mounted to the windshield of a motor vehicle.
Figure 2:
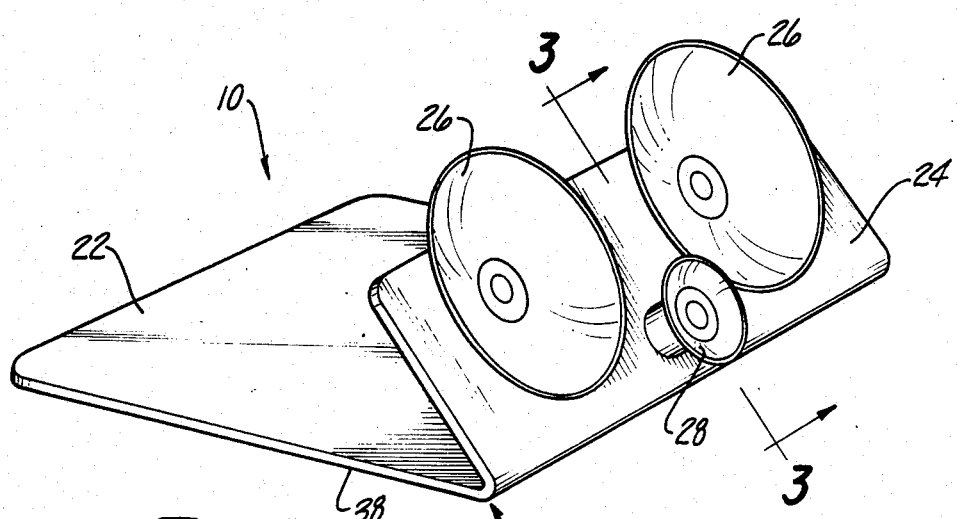
FIG. 2 is an elevated perspective of a preferred embodiment of the present invention.
Figure 3:
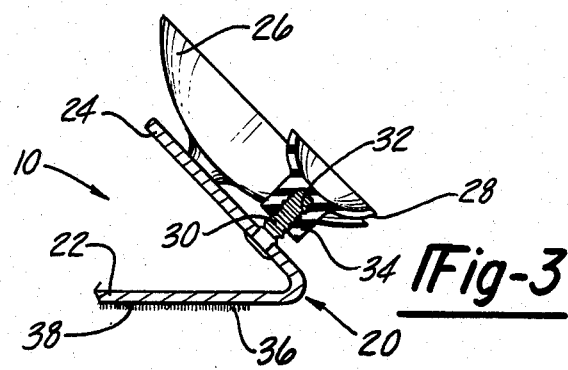
FIG. 3 is a partial cross-sectional view of the present invention taken along lines 3—3 of FIG. 2.

Referring generally to FIGS. 1 through 3, a bracket 10 for mounting a radar detector 12 or like device to the interior surface of the windshield 14 of a motor vehicle 16 and embodying the present invention is thereshown. The bracket 10 is designed to maintain the device 12 in a substantially horizontal position such that it is easily accessible to the user. Moreover, although the preferred embodiment of the bracket 10 supports a radar detector 12, it should be understood that devices such as stereo components or cassette players may also be supported by the bracket 10.

As is best shown in FIG. 2, the bracket 10 includes a substantially planar support 20 having a first or support portion 22 and a second or mounting portion 24. Portions 22 and 24 are integrally formed at an acute angle to each other such that the second portion 24 is disposed above the first portion 22. The angle formed by the portions 22 and 24 is such that when the bracket is placed in the desired position, the first portion 22 will be disposed substantially horizontally in order to maintain the device 12 in the proper position.

Secured to the second portion 24 of the support 20 are main suction cups 26. In a preferred embodiment of the present invention, the bracket 10 includes at least two main suction cups 26 although any number of suction cups may be included in order to fully support the device 12. The main suction cups 26 are permanently secured to the second portion 24 of the support 20 and are made of a resilient rubber material which allows the suction cup 26 to closely conform to the windshield 14 or similar flat surface.

Referring now to FIGS. 2 and 3, in addition to the main suction cups 26, at least one secondary suction cup 28 is secured to the second portion 24 of the support 20. The secondary suction cup 28 is provided with means for longitudinally adjusting the axial position of the suction cup 28 relative to the second portion 24 of the support 20. The adjusting means preferably comprises a threaded bolt 30, which extends through or is secured to the second portion 24 of the support 20, and a correspondingly threaded bore 32 formed in the base 34 of the secondary suction cup 28. It is to be understood that although the preferred embodiment utilizes the threaded bolt and bore arrangement to longitudinally adjust the position of the suction cup 28, other means may be utilized to alter the axial or angular position of the secondary suction cup 28 in order to mount the bracket 10.

Since the threaded bore 32 conforms to the threaded bolt 30, rotation of the secondary suction cup 28 will cause it to be displaced in a longitudinal direction relative to the second portion 24 of the support 20. Thus, rotation of the suction cup 28 clockwise will cause it to move towards the second portion 28. Conversely, rotation of the suction cup 28 in a counter-clockwise direction will cause it to move away from the second portion 24 of the support 20. Depending upon the slope of the windshield 14, the suction cup 28 may be adjusted so that the bracket 10 can be mounted to the windshield while maintaining the first portion 22 of the support 20 in a horizontal position.

As is best shown in FIG. 3, the first portion 22 of the support 20 is provided with means for securing the radar detector 12, or like device, to the bracket 10. In the preferred embodiment, the securing means comprises a set of hook and pile strips 36 mounted to the underside 38 of the support 20. The hook and pile strips 36 adhere to a matching set of hook and pile strips (not shown) mounted to the top of the radar detector 12. Thus, the device 12 can be readily secured to or detached from the bracket 10. Alternatively, the device 12 may be permanently secured to the bracket 10 or integrally formed therewith such that both the device 12 and bracket 10 can be simultaneously mounted to the windshield 14 as necessary.

Use of the present invention provides for simple removal or mounting of a radar detector or like device 12 within the interior compartment of a motor vehicle 16. The device 12 is first secured to the support 20 of the bracket 10 such that the controls of the device 12 will be facing towards the rear of the vehicle once mounted. Thereafter, the secondary suction cup 28 is adjusted according to the slope of the windshield 14 so that the first portion 22 of the support 20 and the device 12 will be maintained in a substantially horizontal position once mounted. However, once the suction cup 28 is adjusted according to the slope of the windshield, readjustment will not be necessary since windshield slopes generally vary only between vehicle models. Thus, once the proper angle is determined and the suction cup 28 adjusted accordingly, the bracket 10 may be mounted to the windshield 14 simply by pressing the suction cups against the windshield until substantially all of the air is forced from between the suction cups and windshield thereby creating a vacuum.

Thus, the present invention provides a simple and inexpensive method of mounting a radar detector or similar component to the interior of a motor vehicle in a position which is readily accessible to the user. In addition, the bracket 10 reduces the risk of theft by allowing the user to dismount and mount the device 12 and/or bracket 10 as required.

The foregoing detailed description has been provided for a better understanding of the invention only and no unnecessary limitations should be understood therefrom as some modifications will be apparent to the skilled in those art without deviating from the spirit and scope of the appended claims.

I claim:

1. A bracket for supporting a radar detector or like device within a motor vehicle having a windshield, said bracket comprising:

a substantially planar mounting portion;

a substantially planar support portion extending at an acute angle from said mounting portion;

means for detachably securing said bracket to said windshield so that said support portion is oriented in a substantially horizontal position, said securing means comprising at least two suction cups disposed on said mounting portion to engage said windshield;

means for adjusting the orientation of said bracket with respect to the windshield, said means for adjusting comprising a selectively adjustable spacer disposed between said windshield and said mounting portion at a location vertically spaced from said at least two suction cups, wherein adjusting said spacer alters the angular relationship between the windshield and the mounting portion, thereby altering the orientation of said bracket to achieve a horizontal orientation of said support portion; and means for removably mounting said radar detector or like device to the support portion of said bracket.

2. The bracket as defined in claim 1 wherein said means for adjusting further comprises at least one secondary suction cup having a base, said adjustable spacer being disposed intermediate said mounting portion and said secondary suction cup.

3. The bracket as defined in claim 2 wherein said adjustable spacer comprises an outwardly threaded bolt retained by and extending perpendiculary from said mounting portion and a correspondingly inwardly threaded bore formed in the base of said secondary suction cup.

4. The bracket as defined in claim 3 wherein said secondary suction cup is adjusted by rotating said secondary suction cup relative to said threaded bolt such that said threaded bolt extends into said threaded bore of said secondary suction cup.

5. The bracket as defined in claim 1 wherein said mounting means comprises hook and pile strips attached to the underside of said support portion and wherein the radar detector or like device is provided with matching hook and pile strips such that the device may be removably secured to said support portion of said bracket.

6. The bracket as defined in claim 4 wherein said secondary suction cup is adjusted in accordance with the slope of the motor vehicle windshield thereby maintaining said support portion in a substantially horizontal position.

7. The bracket as defined in claim 2 wherein said secondary suction cup is disposed substantially between said primary suction cups.

8. The bracket as defined in claim 1 wherein said mounting and support portions of said bracket are integrally formed.

9. The bracket as defined in claim 1 wherein said primary suction cups are made of a resilient rubber material.

10. The bracket as defined in claim 2 wherein said secondary suction cups are made of a resilient rubber material.

11. In combination
a radar detector and a bracket for mounting the radar detector to the windshield of an automobile of the like, said windshield lying in an acute angle with respect to a vertical plane, said bracket comprising a substantially planar mounting portion;
a substantially planar support portion extending at an acute angle from said mounting portion; and means for detachably securing said bracket to said windshield so that said support portion is oriented in a substantially horizontal position, said securing means comprising at least two suction cups disposed on said mounting portion to engage said windshield;
said bracket further comprising spacing means mounted on said mounting portion and engaging said windshield to space said bracket from said windshield, said spacing means being disposed at a point offset from a line connecting the center of said suction cups, said spacing means being positioned closer to said support portion than said suction cups so that said spacing means maintains said support portion in a substantially horizontal plane,
wherein said support portion and said mounting portion each lie in planes which intersect at an acute angle substantially equal to the angle of the windshield,
means for mounting said radar detector to said support portion of said bracket so that said radar detector depends from said support portion.

12. The combination as defined in claim 11 and in which said spacing means comprises a third suction cup.

* * * * *

UNITED STATES PATENT AND TRADEMARK OFFICE
CERTIFICATE OF CORRECTION

PATENT NO. : 4,648,572

DATED : March 10, 1987

INVENTOR(S) : Steven Sokol

It is certified that error appears in the above-identified patent and that said Letters Patent is hereby corrected as shown below:

Col. 4, lines 7 and 8, delete "the skilled in those art" and insert --those skilled in the art--.

Column 5, Claim 11, line 3, delete "of", second occurrence, and insert --or--.

Signed and Sealed this

Twenty-ninth Day of September, 1987

Attest:

DONALD J. QUIGG

Attesting Officer     Commissioner of Patents and Trademarks